United States Patent [19]

Grant

[11] Patent Number: 4,577,457
[45] Date of Patent: Mar. 25, 1986

[54] TREE TRIMMING APPARATUS

[76] Inventor: Spencer H. Grant, 1220 Millers Mil Rd., P.O. Box 450, Stockbridge, Ga. 30281

[21] Appl. No.: 587,609

[22] Filed: Mar. 8, 1984

Related U.S. Application Data

[63] Continuation-in-part of Ser. No. 348,493, Feb. 12, 1982, Pat. No. 4,455,815.

[51] Int. Cl.³ .............................................. A01D 55/8
[52] U.S. Cl. ........................................ 56/235; 56/233
[58] Field of Search .................................. 56/233-237

[56] References Cited

U.S. PATENT DOCUMENTS

| 216,915 | 6/1879 | Unkrich | 56/233 |
| 794,538 | 7/1905 | Nolting | 56/236 |
| 1,857,342 | 5/1932 | Albrecht | 56/237 |
| 1,866,380 | 7/1932 | Wagner | 56/DIG. 4 |
| 1,869,394 | 8/1932 | Sikma | 56/235 |
| 3,415,046 | 12/1968 | Leydig et al. | 56/235 |
| 3,433,005 | 3/1969 | Deigaard et al. | 56/235 |
| 4,174,604 | 11/1979 | Wilson, Sr. et al. | 56/237 |

FOREIGN PATENT DOCUMENTS

| 2651425 | 9/1978 | Fed. Rep. of Germany | 56/237 |
| 184264 | 6/1887 | France | 56/233 |
| 190720 | 5/1888 | France | 56/233 |
| 868 | of 1890 | United Kingdom | 56/236 |
| 564073 | 9/1944 | United Kingdom | 56/235 |

*Primary Examiner*—Paul J. Hirsch
*Attorney, Agent, or Firm*—B. J. Powell

[57] ABSTRACT

Tree trimming apparatus adapted to be manually controlled by an operator including a support frame with ground engaging wheel and manually engageable handle means for the operator to guide the apparatus while trimming trees, mast means mounted on the support frame and extending upwardly and outwardly therefrom and mounting cutter means adapted to trim a tree as the operator guides the apparatus around a tree, and drive means for rotating the cutter means and propelling the apparatus. A riding attachment may be provided for the operator to ride.

8 Claims, 4 Drawing Figures

TREE TRIMMING APPARATUS

CROSS-REFERENCE TO RELATED APPLICATIONS

This application is a continuation-in-part of my co-pending application Ser. No. 348,493 filed Feb. 12, 1982 now U.S. Pat. No. 4,455,815.

BACKGROUND OF THE INVENTION

This invention relates generally to tree trimming apparatus and more particularly to a self-propelled tree trimming apparatus which is guided around the tree by an operator.

It is necessary to perodically trim or prune growing trees to obtain the desired shape of the tree. This is especially true with trees such as Christmas trees which need to have a prescribed shape for sale.

Various tree trimming apparatus have been used to trim trees. In one type, the tree trimming apparatus is totally supported by the operator who supports and guides the cutting means to trim the tree. One of the primary problems with hand-held tree trimming apparatus is that it is difficult to maintain uniformity in the trimmed tree and to trim the tree at a desired angle. Machine mounted tree trimming apparatus have also been proposed such as those disclosed in U.S. Pat. Nos. 2,940,486; 3,330,068; 3,496,709; 3,497,908; 3,888,071; and 3,913,304. One of the major problems with machine mounted tree trimming apparatus is that the apparatus is so large it is difficult to gain access to the trees for trimming when the trees are planted on standard spacing. This is especially true for Christmas trees. Another problem with such machine mounted tree trimming apparatus is that it is time consuming to set up the apparatus for trimming the tree to assure uniform tree trimming and to maintain the desired trimming angle. Another problem with prior art machine mounted trimming apparatus is that they are complex and expensive to manufacture. As a result, prior art machine mounted tree trimming apparatus have not found widespread use, especially in the growing and trimming of Christmas trees.

SUMMARY OF THE INVENTION

These and other problems and disadvantages associated with the prior art are overcome by the invention disclosed herein by providing a tree trimming apparatus which is sufficiently compact to allow access to be gained to trees planted on standard spacing such as those associated with the growing of Christmas trees and which assures that the tree will be uniformly trimmed at the desired angle. Further, the tree trimming apparatus is simple in construction, thereby making it economically feasible for operation to trim trees such as Christmas trees. While the tree trimming apparatus is manually controlled, it is constructed to constantly provide an orientation reference to the operator to assure uniform trimming even though the terrain on which the trees are growing may not be level and to permit the operator to easily control the apparatus so that the trees will be properly trimmed.

The apparatus of the invention includes generally a support frame mounted on ground engaging wheel means to roll along the ground together with a manually engageable handle means so that an operator can grasp the handle means to support the support frame in combination with the wheel means and guide the tree trimming apparatus. Mast means is mounted on the support frame and extends upwardly and outwardly from one side of the wheel means and is provided with cutter means adapted to trim a tree as the operator guides the tree trimming apparatus around the tree. Drive means is provided for rotating the cutter means and for propelling the tree trimming apparatus around the tree so that the operator only has to guide the tree trimming apparatus as it moves around the tree.

These and other features and advantages of the invention disclosed herein will become more apparent upon consideration of the following specification and accompanying drawings wherein like characters of reference designate corresponding parts throughout the several views and in which:

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 1:
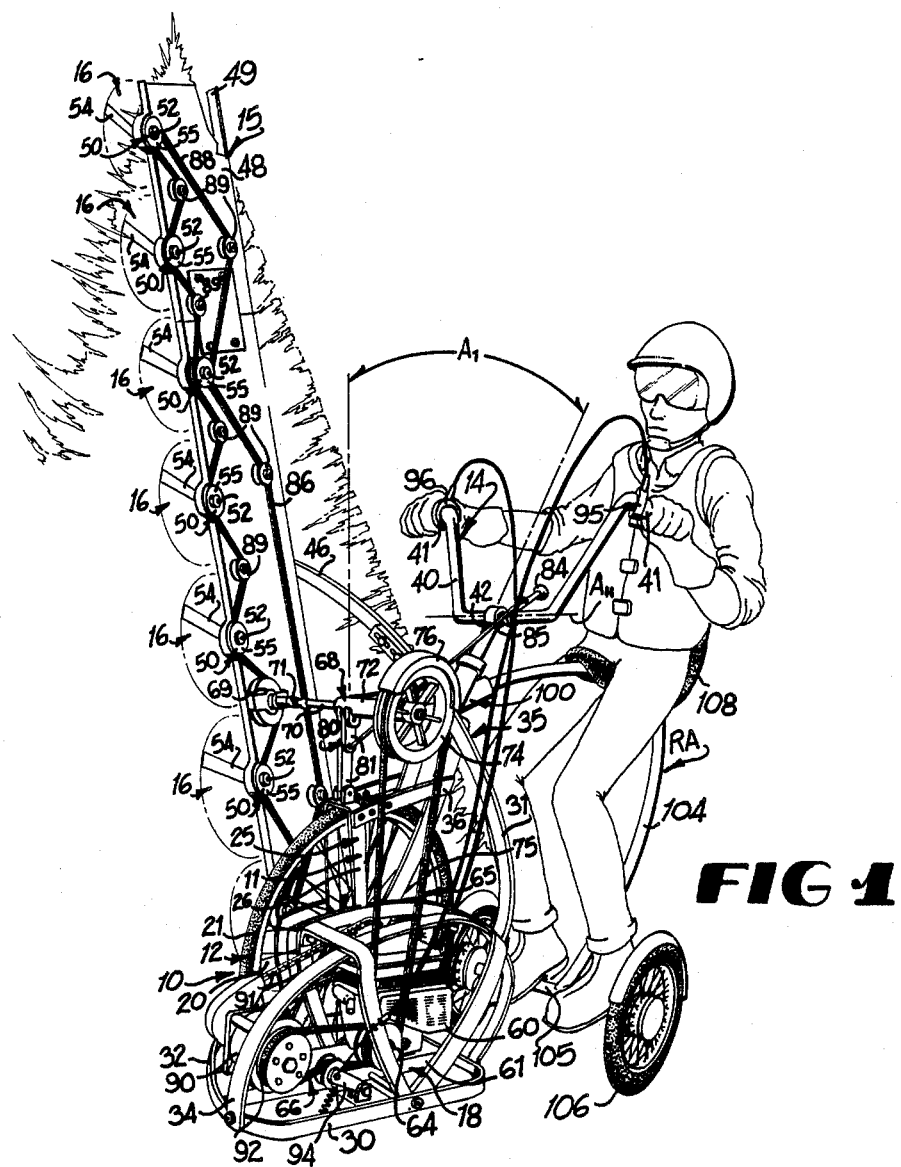
FIG. 1 is a perspective view of the tree trimming apparatus incorporating the invention in operation.
Figure 2:
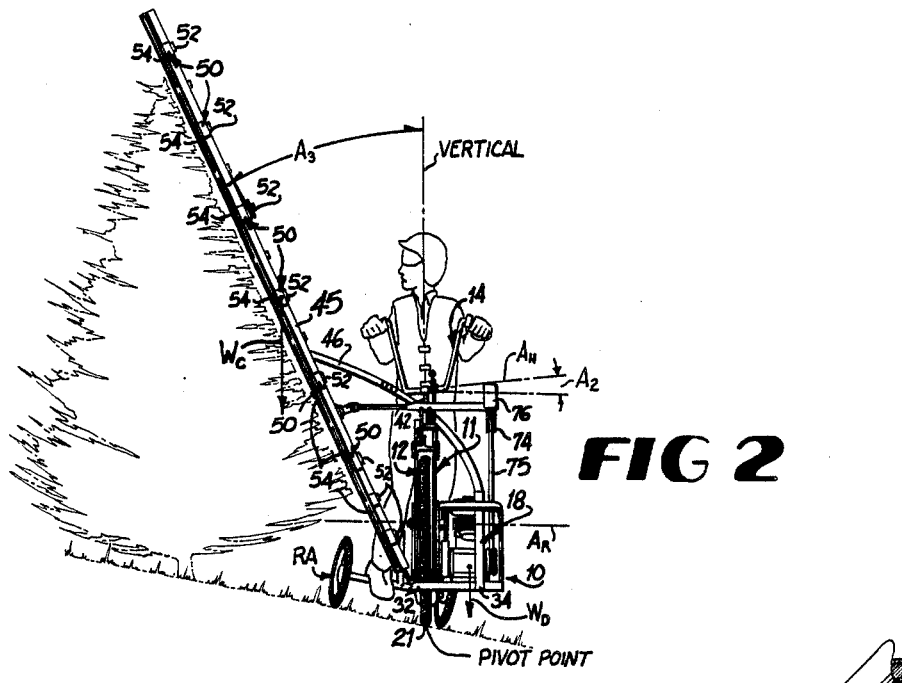
FIG. 2 is a front view thereof.
Figure 3:
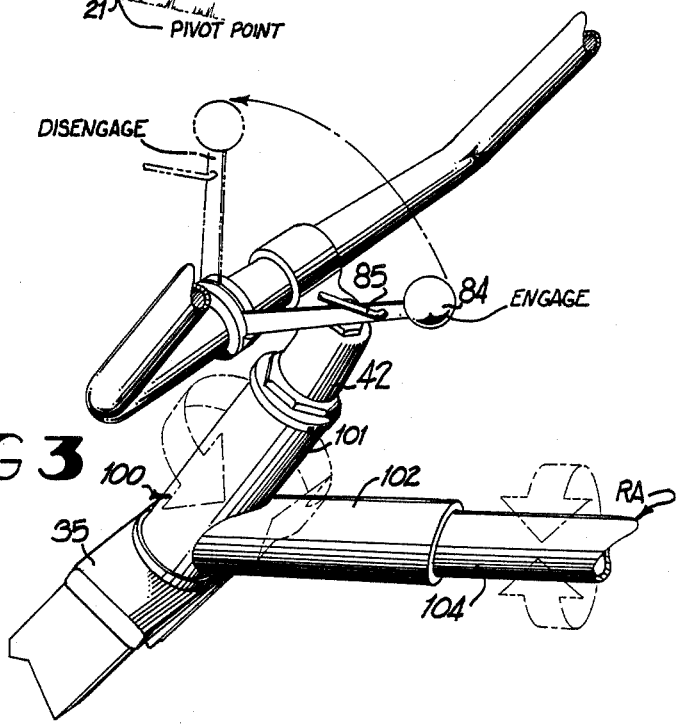
FIG. 3 is an enlarged perspective view illustrating the connection between the trimming apparatus and the riding attachment.
Figure 4:
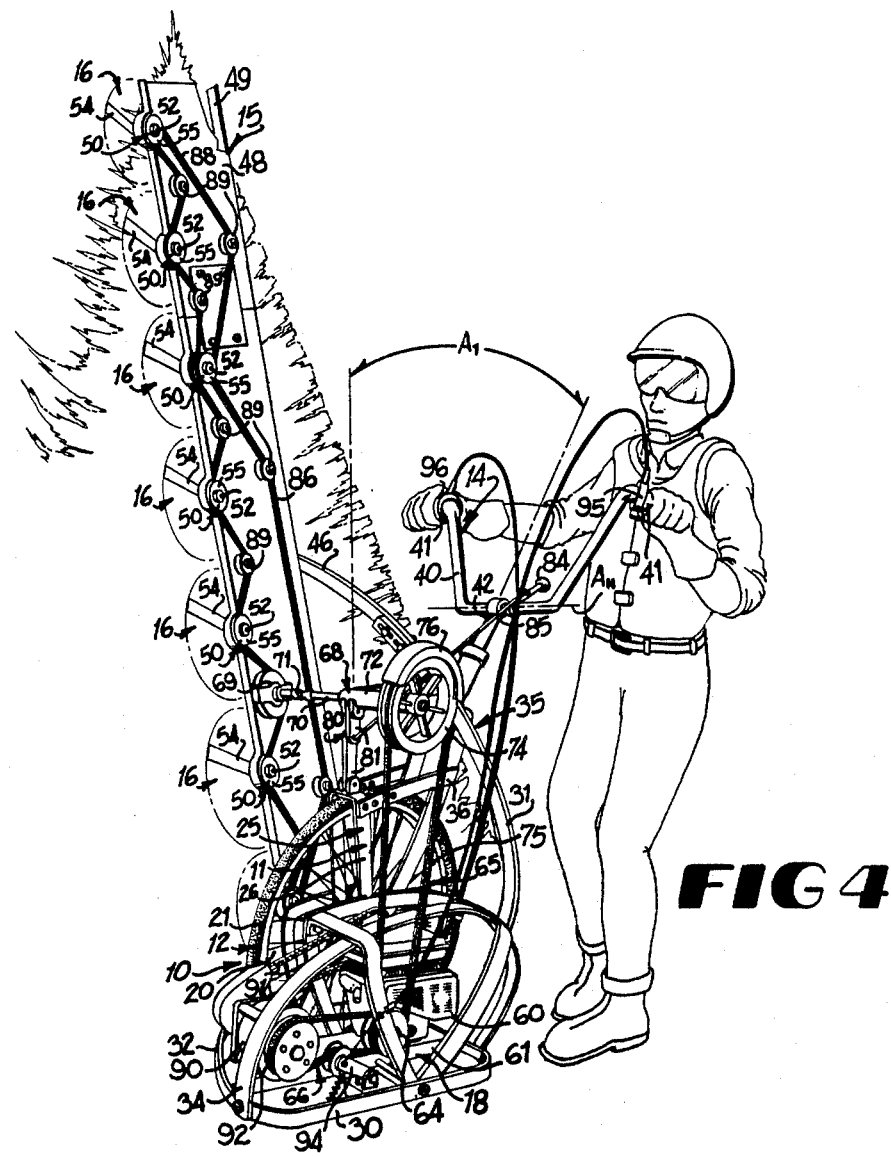
FIG. 4 is a perspective view illustrating the tree trimming apparatus without the riding attachment in use.

Referring to the drawings, it will be seen that the invention is incorporated in a tree trimming apparatus 10 which may be provided with a riding attachment RA as seen in FIGS. 1–3. It will likewise be seen that the trimming apparatus 10 may be used without the riding attachment as seen in FIG. 4. The invention is designed primarily for trimming small trees such as Christmas trees which are typically grown on a commercial scale. These trees are trimmed to produce a desired overall shape but the plot of ground on which they are grown may not be level so as to hinder the mechanical orientation of the trimming apparatus.

More particularly, the tree trimming apparatus 10 includes generally a support frame 11, a ground engaging wheel means 12 rotatably mounted in the support frame about a horizontal axis $A_R$, a manually engageable handle means 14 on the support frame so that an operator can grasp the handle means to support the support frame in combination with the wheel means and guide the tree trimming apparatus, mast means 15 mounted on the support frame and extending upwardly and outwardly therefrom on one side of the wheel means 12, and cutter means 16 mounted on the mast means and adapted to trim a tree as the operator guides the tree trimming apparatus around the tree. The tree trimming apparatus 10 also includes a drive means 18 for drivingly rotating the cutter means 16 and for rotating the wheel means 12 to propel the tree trimming apparatus around the tree.

As best seen in FIGS. 1 and 2, the ground engaging wheel means 12 includes a wheel 20 which mounts a pneumatic tire 21 thereon. While different wheel means may be used the wheel means 12 illustrated in FIGS. 1 and 2 is a bicycle wheel and tire equipped with an appropriate mounting assembly rotatably attaching the wheel 20 to the frame 11.

The support frame 11 includes an inverted U-shaped support bracket 25 with depending legs 26 on opposite sides of the wheel 20 that are connected at their upper ends by a central web 28 extending over the tire 21. The mounting assembly on the wheel 20 is connected between the legs 26 intermediate their ends so that the wheel 20 is free to rotate about the axis $A_R$. The lower end of the leg 26 on one side of the wheel 20 is connected to a support platform 30 to mount the drive means 18 thereon. The platform 30 is also connected to the frame 11 above the wheel 20 by an upstanding connecting member 31 while a lower connecting member 32 extends around the lower portion of the wheel to connect the front and rear ends of the platform 30 to the lower end of the leg 26 on the opposite side of the wheel 20. Auxiliary connecting members 34 connect member 31 and platform 30 to further stabilize same.

To permit the trimming apparatus 10 to be manually controlled, the legs of a fork member 35 are connected at their lower ends to the legs 26 on opposite sides of the wheel 20 and also to the U-shaped support bracket 25 adjacent the upper end thereof by links 36. This locates the fork member at angle $A_1$ with respect to the U-shaped support bracket 25. The links 36 have a plurality of attachment holes therein to permit the angle $A_1$ to be changed to accommodate different operators.

The fork member 35 mounts the handle means 14 on the outer projecting end thereof so that the operator can grasp the handle means 14 to balance the trimming apparatus on its wheel 20 as will become more apparent. The handle means 14 includes a handlebar 40 provided with a pair of spaced apart hand grips 41 at opposite ends thereof. The particular handlebar 40 illustrated is of the drop center type with its central section connected to the outer end of the fork member 35 by connector 42. The connector 42 is of the type used to connect bicycle handlebars to the bicycle fork and is connected to the fork member 35 so that the connector 42 can be rotated about the central axis of the fork member 35. The central section of the handlebar 40 extends through a passage in the connector 42 oriented normal to the central axis of the connector 42 and displaced laterally thereof so that the handlebar 40 can be rotated about the axis $A_H$ of the central section of the handlebar 40. The connector 42 is rotated about the fork member axis until the handlebar axis $A_H$ is shifted with respect to the horizontal by the angle $A_2$ when viewed from the front of the trimming apparatus as seen in FIG. 2 with the trimming apparatus in its operative position. The angle $A_2$ and the relative rotational position of the handlebar 40 about the axis $A_H$ is selected so that the operator guiding the trimming apparatus 10 around the tree being trimmed can move along the track of the tire 21. Since both the operator and the tire 21 move around the same diameter circle about the tree being trimmed, the operator can more easily keep the tree trimming apparatus moving around the tree at the desired circle diameter. The rotational position of the handlebar 40 about the axis $A_H$ and/or the angle $A_1$ between the form member 35 and the bracket 25 can be adjusted to accommodate operators of different heights. Typically, this adjustment is made so that, when the operator is comfortably holding the tree trimming apparatus 10 by the hand grips 41, the U-shaped support bracket 25 will be generally vertically oriented as seen in FIGS. 1 and 4.

The mast means 15 includes an elongate base support plate 45 which is connected at its lower end to that leg 28 of the U-shaped support bracket 25 opposite the drive support platform 30 and extends upwardly and outwardly therefrom. To maintain the upper end of the base support plate 45 in position, an adjustable link 46 connects the upper portion of the plate 45 with the support frame 11. It will be seen that when the trimming apparatus is viewed from the side, the base support plate 45 is generally vertically oriented but when viewed from the front of the trimming apparatus as seen in FIG. 2, defines an angle $A_3$ with respect to the vertical when the trimming apparatus is in operative position as will become more apparent. The link 46 is adjustable so that the angle $A_3$ can be changed. To accommodate trees of different heights, an elongate extension support plate 48 is removably connected to the upstanding end of the base support plate 45 and projects outwardly and upwardly therefrom coplanar with the support plate 45 and in axial alignment therewith. As will become more apparent, shorter trees are trimmed with the extension support plate 48 removed and with the angle $A_3$ greater than the angle $A_3$ when the taller trees are trimmed with the extension support plate in position. As will become more apparent, the removable extension support plate 48 allows the trimming apparatus to remain in balance with the different angles $A_3$. Both support plates 45 and 48 are provided with an outwardly directed flange 49 along the rear edge thereof to protect the operator from the cutter means 16 as will become more apparent.

The cutter means 16 includes a plurality of cutter heads 50, some of which are mounted on the base support plate 45 and some of which are mounted on the extension support plate 48 at longitudinally spaced positions therealong. In the particular embodiment illustrated, there are five cutter heads 50 mounted on the extension support plate 48. The cutter heads 50 on each support plate are mounted along a common longitudinally extending path on the support plate so that, when the extension support plate 48 is mounted on the base support plate 45 as illustrated in the figures, the cutter heads 50 are located along a common longitudinally extending path along the plates 45 and 48.

Each cutter head 50 includes a bearing which is mounted on the support plate carrying the cutter head 50 and in which is rotatably journalled a mounting shaft 52. The mounting shaft 52 is oriented normal to the plane of the support plate mounting the bearing 51 and projects both outwardly and inwardly of the support plate mounting the cutter head 50. The outboard end of the shaft 52 mounts a cutter blade 54 thereon outboard of the support plate while the inboard end of the mounting shaft 52 mounts a drive pulley 55 thereon inboard of the support plate. The size of the cutter blades 54 and the spacing of the cutter heads longitudinally of the plates 45 and 48 are selected so that the cutting circles subtended by the cutting blades 54 lie generally end-to-end along the length of the plates 45 and 48 and coplanar therewith. The cutting circles also lie forwardly of the flange 49 along the rear edges of the plates 45 and 48 to deflect debris away from the operator.

The drive means 18 includes an internal combustion engine 60 positioned on the support platform 30 by a motor mount 61 so that the output shaft on the engine is oriented generally parallel to the wheel axis $A_R$. The engine output shaft mounts a double sheave pulley 64 thereon. The motor mount 61 may be adjustable to shift the engine 60 toward and away from the wheel 20 as will become more apparent.

The drive means 18 also includes a cutter transmission system 65 to transmit power from the engine output shaft to the cutter heads 50 and a wheel transmission system 66 to transmit power from the engine output shaft to the wheel 20 to propel the apparatus 10. The systems 65 and 66 allow the operator to selectively drive the cutter heads 50 and selectively drive wheel 20 independently of each other to facilitate the operation thereof.

The cutter transmission system 65 includes a transfer drive assembly 68 with a output pulley 69 journalled on the support plate 45 between two of the pulleys 55 in the cutter heads 50. A transfer shaft 70 is connected at one end to pulley 69 through universal joint 71 and projects out over the wheel 20. The other end of the shaft 70 is journalled in a bearing mounted on a link 72 pivoted on the support frame 11 so that the end of the shaft 70 above the engine 60 can be moved up and down toward and away from the engine 60. The projecting end of shaft 70 has a drive pulley 74 thereon connected to the pulley 64 on the engine shaft 62 by belt 75. A keeper 76 extends partly around the pulley 74 to keep the belt 75 in engagement therewith.

It will be appreciated that the belt 75 can be selectively tightened and loosened as the link 72 is pivoted to move the drive pulley 74 away from and toward the engine shaft pulley 64. To pivot link 72, a latch mechanism 80 is provided. The latch mechanism 80 includes a pair of links 81 and 82 pivoted together at one of their ends. The other end of the link 81 is pivoted to the link 72 while the other end of the link 82 is pivoted to the frame 11. The joint between the links 81 and 82 is connected to a positioning handle 84 pivoted on the handle bar 40 by a drive rod 85. As the handle 84 is pivoted toward the operator, the belt 75 is tightened and loosened as the handle is pivoted away from the operator. An appropriate stop is provided to limit the movement of the handle 84 toward the operator and the links 81 and 82 are sized so that belt tension keeps the handle 84 against the stop to lock the latch mechanism 80 in the drive position.

The output pulley 69 lies in the same plane as the cutter head pulleys 55 but is displaced laterally out of the common path along which the pulleys 55 are located. A drive belt 86 is trained around the output pulley 69 and the pulleys 55 on the base support plate 45 to drive them. The pulley 55 on the uppermost cutter head 50 on base plate 45 is a double sheave pulley and a secondary drive belt 88 connects that pulley 55 with the rest of the pulleys 55 on the extension support plate 48. Appropriate idler pulleys 89 are mounted on the support plate 45 to keep the belts 86 and 88 taut and in driving engagement with the pulleys 69 and 55.

The wheel transmission system 66 includes a gear reducer 90 mounted on the support platform 30 with its output shaft connected to an appropriate sprocket on the wheel 20 by drive chain 91. The input shaft to the gear reducer 90 is connected to the engine drive pulley 64 by drive belt 92. The drive belt 92 can be moved into and out of driving engagement between the engine drive pulley 64 and the gear reducer 90 with a belt tensioner 94. The belt tensioner 94 is tightened with an appropriate control 95 at one of the hand grips 41 on the handlebar 40 so that the operator can selectively tighten the tensioner 94 to cause the gear reducer 90 to rotate the wheel 20 through the drive chain 91. The belt tensioner 94 is spring urged toward a disengage position so that when the operator releases the control 95, tension will be removed from the drive belt 92 and the apparatus will stop.

Thus it will be seen that the operator can selectively connect the engine drive pulley 64 to the wheel 20 to drive same through the wheel transmission system 66 and selectively connect the engine drive pulley 64 to the cutter means 16 through the cutter transmission system 65. The engine speed is controlled by the operator through an appropriate throttle control 96 at one of the hand grips 41 on the handlebar 40.

It will be understood that other drive systems may be used in lieu of the engine and belt drive illustrated. For instance, a hydraulic pump and motor arrangement may be driven by the engine to operate the cutters. The battery and electric motors illustrated in my earlier application Ser. No. 348,493 may likewise be used.

It will be appreciated that the trimming apparatus 10 can be used with the riding attachment RA as seen in FIGS. 1 and 2 where the operator rides on the riding attachment RA or it can be used without the riding attachment as illustrated in FIG. 4 where the operator walks behind the apparatus 10. The operation of the tree trimming apparatus 10 is essentially the same in both instances.

The riding attachment RA as seen in FIGS. 1 and 2 is connected to the fork member 35 by a connector 100 seen in detail in FIG. 3. The connector 100 includes a primary tubular section 101 which is rotatably journalled on the fork member 35 adjacent the handlebar connector 42 so that the connector 100 can rotate about the axis of the fork member 35. A secondary tubular section 102 is connected to the tubular section 101 and projects rearwardly therefrom generally horizontally when the apparatus 10 is in its operative position. The secondary tubular section 102 rotatably mounts the riding attachment RA therein for rotation about the generally horizontal axis thereof.

The riding attachment RA illustrated includes a support tube 104 which is rotatably journalled in the secondary tubular section 102 and projects rearwardly therefrom and curves downwardly to join with a cross tube 105, the opposite ends of which mount wheels 106 thereon. The support tube 104 mounts the operator seat 108 thereon so that the operator can rest his feet on the cross tube 105 between the wheels 106. It will be appreciated that the riding attachment RA shown is for illustration purposes only and may have many different configurations. As will become more apparent, it is important that the riding attachment RA be held against movement toward and away from the primary tubular section 101 but freely rotate about the axis of the secondary tubular section 102 so that the trimming apparatus 10 can be moved from side to side to pivot on the tire 21 where it engages the ground.

The construction of the trimming apparatus 10 permits the operator to maintain the blades 54 on the cutting means 16 at the desired angle $A_3$ with respect to the vertical. This is important since trees typically grow vertically without regard to the angle of the ground with respect to the horizontal as is illustrated in FIG. 2. Therefore, it is important that the angle $A_3$ with respect to the vertical be maintained without regard to the angle of the terrain.

As seen in FIG. 2, it will be appreciated that the apparatus 10 is free to pivot from side to side about that point where the tire 21 engages the ground. Thus, it will be seen that the weight of the cutter means 16 and mast means 15 indicated at $W_C$ in FIG. 2 tends to pivot the apparatus 10 on the tire 21 in the counter-clockwise direction while the weight of the drive means 18 indicated at $W_D$ tends to pivot the apparatus 10 about the tire 21 in the clockwise direction. The lateral spacing of the drive means 18 with respect to the tire 21 is selected so that the moment exerted on the apparatus 10 in the clockwise direction offsets the moment exerted on the apparatus 10 in the counter-clockwise direction when the wheel 20 is vertical. If the apparatus 10 is allowed to pivot in either direction away from the vertical as seen in FIG. 2, the effective moment arm of the weights $W_C$ and $W_D$ change so that the apparatus 10 tries to continue to pivot away from the vertical in the initial direction that the pivoting starts. This increases the force that the operator must manually offset through the handle means 14 to keep the trimming apparatus upright. As a result, the operator immediately knows when he lets the apparatus 10 pivot away from the vertical since the offsetting moment he must exert through the handle means 14 increases. Thus, the operator simply keeps the trimming apparatus 10 located so that the side-to-side moments on the apparatus 10 are in the neutral position where the counterclockwise moment of force generated by the weight of the mast and cutter means offsets the clockwise moment of force generated by the weight of the drive means. This keeps the plane of wheel 20 vertical and thus maintains the angle of the cutters 54 on the cutter means 16 at the angle $A_3$ with respect to the vertical.

It will be seen that when the riding attachment RA is used, the rotational connection between the support tube 104 and the secondary tubular section 102 on the connector 100 allows the riding attachment RA to rotate about a generally horizontal lateral pivot axis to permit the operator to shift the trimming apparatus from side-to-side about that portion of the tire 21 engaging the ground. Of course, the rotation of the primary tubular section 101 about the fork member 35 permits the wheel to to be turned about a generally upstanding turning axis so that the apparatus 10 with the riding attachment RA thereon can move about the tree at the desired cutting circle diameter. Preferably the upstanding turning axis passes generally through the center of wheel 20.

As indicated earlier, when the angle $A_3$ is increased for the shorter trees, the extension 48 is removed. This is sized so that the increased moment arm of the weight $W_C$ is offset by the decrease in the weight $W_C$ so that the net counter-clockwise moment remains the same. It will likewise be appreciated that the motor support 61 which mounts the engine 60 can be adjustably moved toward or away from the wheel 20 to change the clockwise moment arm tending to pivot the trimming apparatus 10 in the clockwise direction as seen in FIG. 2 if it is necessary to adjust the clockwise moment to match the counter-clockwise moment of the cutter means 16 and the mast means 15.

As indicated earlier, the angle $A_2$ of the handlebar 40 with respect to the horizontal offsets the handlebar 40 so that the operator remains centered over the tire track of the wheel 20 as it moves around the tree on the desired cutting diameter. This is true whether the operator is walking as seen in FIG. 4 or riding as seen in FIGS. 1 and 2. Such an arrangement helps the operator keep the trimming apparatus 10 moving along a constant diameter circle around the tree being trimmed to assure even trimming.

To further assist the operator in keeping the wheel 20 vertical, a gyroscopic stabilizer may be mounted on the support platform 30. Such a stabilizer would oppose any side-to-side pivoting of the wheel 20 away from the vertical.

What is claimed as invention is:

1. Tree trimming apparatus adapted to be manually controlled by an operator including:

a support frame;

a single ground engaging wheel rotatably mounted in said support frame and adapted to partially support said support frame on the ground so that said frame and wheel can pivot from side-to-side about the point where the wheel engages the ground;

manually engageable handle means on said support frame so that the operator can grasp said handle means to guide the tree trimming apparatus, said handle means constructed and arranged so that the operator can exert side-to-side moments of force on said trimming apparatus to control the side-to-side pivoting movement thereof about the point where the wheel engages the ground;

mast means mounted on said support frame and extending upwardly and outwardly therefrom on one side of said wheel;

cutter means mounted on said mast means to trim a tree as the operator guides the apparatus around the tree, said cutter means having a cutting plane defining a prescribed angle with respect to the plane of the wheel so that when said wheel is vertically oriented, said cutting plane defines the prescribed angle with respect to the vertical, the combined weight of said mast means and said cutter means exerting a moment of force on said apparatus tending to pivot said apparatus from side-to-side in a first direction about the point where the wheel engages the ground; and drive means mounted on said support frame on the opposite side of said wheel from said mast means and drivingly connected to said cutter means to operate same, the weight of said drive means exerting a moment of force on said apparatus tending to pivot said apparatus from side-to-side in the direction opposite said first direction about the point where the wheel engages the ground, said drive means positioned relative to said wheel so that the moment of force exerted on said apparatus by the combined weight of said mast means and said cutter means equals the moment of force exerted on said apparatus by the weight of said drive means only when said wheel is vertically oriented to provide an indication to the operator through the handle means when the wheel is vertically oriented.

2. The tree trimming apparatus of claim 1 wherein said drive means is further drivingly connected to said ground engaging wheel to rotate same and propel said apparatus over the ground.

3. The tree trimming apparatus of claim 1 wherein said drive means includes an engine having an output shaft and cutter transmission means selectively connecting said engine output shaft to said cutter means to drive same.

4. The tree trimming apparatus of claim 3 wherein said cutter means includes a plurality of cutter heads mounted on said mast means at longitudinally spaced apart positions, each of said cutter heads including a shaft rotatably journalled on said mast means, a cutter blade mounted on the shaft outboard of said mast means and a drive pulley mounted on the shaft inboard of said mast means; and wherein said cutter transmission means includes a driven pulley, an endless flexible drive member operatively connecting said driven pulley with said drive pulleys on said cutter heads, and a transfer drive assembly operatively connecting said driven pulley with said engine output shaft to drive same, said transfer drive assembly including manually operable control means for selectively causing said transfer drive assembly to drivingly connect and disconnect said engine output shaft to said driven pulley.

5. The trimming apparatus of claim 3 further including wheel transmission means selectively connecting said engine output shaft to said wheel to drive same and propel said apparatus along the ground.

6. The trimming apparatus of claim 5 wherein said wheel transmission means includes a gear reducer having an output shaft and an input shaft, a first endless flexible member drivingly connecting said reducer output shaft to said wheel, a second endless flexible member drivingly connecting said reducer input shaft to said engine output shaft, and manually operated tensioning means to control the tension in said second endless flexible member to selectively cause said second endless flexible member to drive said wheel through said gear reducer.

7. The trimming apparatus of claim 1 wherein said mast means includes angle adjustment means for selectively changing the prescribed angle between the cutting plane and the plane of the wheel substantially without changing the moment of force exerted on said trimming apparatus by the combined weight of said mast means and said cutter means when said wheel is substantially vertically oriented.

8. The trimming apparatus of claim 1 further including a riding attachment operatively connected to said trimming apparatus to support the operator thereon, said riding attachment connected to said trimming apparatus so that said wheel can be turned with respect to said riding attachment about a generally upstanding axis and so that said trimming apparatus can pivot from side-to-side with respect to said riding attachment about a generally horizontal axis.

* * * * *